US009524406B2

(12) United States Patent
Drzymala et al.

(10) Patent No.: US 9,524,406 B2
(45) Date of Patent: Dec. 20, 2016

(54) APPARATUS FOR AND METHOD OF MINIMIZING SPECULAR REFLECTIONS IN IMAGING FIELD OF VIEW OF WORKSTATION THAT READS TARGETS BY IMAGE CAPTURE

(71) Applicant: SYMBOL TECHNOLOGIES, INC., Schaumburg, IL (US)

(72) Inventors: Mark E Drzymala, St James, NY (US); Edward D. Barkan, Miller Place, NY (US); Caihua (Lucy) Chen, Albany, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 221 days.

(21) Appl. No.: 13/967,386

(22) Filed: Aug. 15, 2013

(65) Prior Publication Data

US 2015/0048165 A1 Feb. 19, 2015

(51) Int. Cl.
*G06K 7/10* (2006.01)

(52) U.S. Cl.
CPC .............. *G06K 7/10* (2013.01); *G06K 7/10732* (2013.01); *G06K 2007/10485* (2013.01)

(58) Field of Classification Search
CPC .................. G06K 7/10722; G06K 7/10; G06K 2007/10485; G06K 7/10732; H04N 1/193; H04N 1/1013; G03G 15/04036; G02B 5/0226; G02B 6/0081
USPC .................................. 250/208.1, 234; 349/96
See application file for complete search history.

(56) References Cited

U.S. PATENT DOCUMENTS

| 4,955,693 | A | 9/1990 | Bobba |
| 5,602,376 | A | 2/1997 | Coleman et al. |
| 6,400,488 | B1 | 6/2002 | Nagasaka et al. |
| 7,571,854 | B2 | 8/2009 | Vinogradov et al. |
| 8,313,033 | B1 | 11/2012 | Vinogradov et al. |
| 8,342,409 | B2 | 1/2013 | Handshaw et al. |
| 2007/0194119 | A1* | 8/2007 | Vinogradov et al. .......... 235/454 |
| 2010/0219248 | A1* | 9/2010 | Barkan et al. ........... 235/462.42 |
| 2012/0160919 | A1 | 6/2012 | Chen et al. |

FOREIGN PATENT DOCUMENTS

WO 2010098999 A1 9/2010

OTHER PUBLICATIONS

International Search Report mailed Oct. 28, 2014 in counterpart application PCT/US2014/048612.

\* cited by examiner

*Primary Examiner* — Sonji Johnson

(57) ABSTRACT

A workstation electro-optically reads targets by image capture, and includes a housing, a generally planar window, an imaging module, and a generally planar fold mirror between the window and the module. The module has an illuminating light assembly for directing illumination light along an illumination path through the window at a target for return therefrom during reading, and an image sensing assembly for detecting return illumination light through the window along an imaging path over an imaging field of view during reading. The fold mirror folds the illumination and the imaging paths. The fold mirror and the window lie in planes that are substantially parallel to each other to prevent reflections of the illumination light off of the fold mirror and the window from entering the imaging field of view as virtual images that degrade target detection by the image sensing assembly.

16 Claims, 4 Drawing Sheets

APPARATUS FOR AND METHOD OF MINIMIZING SPECULAR REFLECTIONS IN IMAGING FIELD OF VIEW OF WORKSTATION THAT READS TARGETS BY IMAGE CAPTURE

FIELD OF THE DISCLOSURE

The present disclosure relates generally to an electro-optical workstation for reading targets by image capture over a range of working distances and, more particularly, to an apparatus for, and a method of, minimizing specular reflections, or virtual images, in an imaging field of view over the range.

BACKGROUND

Solid-state imaging systems or imaging readers have been installed as electro-optical reading workstations, such as vertical slot scanners, each having a single vertical or upright window, or as bioptical scanners, each having a vertical window and a horizontal window, in supermarkets, warehouse clubs, department stores, and other kinds of retailers and other businesses for many years. This workstation electro-optically reads, by image capture, targets, such as one- and two-dimensional bar code symbols, each bearing elements, e.g., bars and spaces, of different widths and reflectivities, to be decoded, as well as non-symbol targets or forms, such as documents, labels, receipts, signatures, drivers' licenses, employee badges, payment/loyalty cards, and the like, each form bearing alphanumeric characters and graphics, to be imaged. An operator or a customer may slide or swipe a product associated with, or bearing, a target in a moving direction across and past a window of the workstation in a swipe mode. Alternatively, the operator or the customer may momentarily present the target associated with, or borne by, the product to an approximate central region of a window in a presentation mode. The choice typically depends on user preference, the target itself, or on the layout of the workstation.

A known exemplary imaging workstation includes a housing supported on, or incorporated in, a support surface, such as a countertop; the aforementioned upright window supported by the housing and facing the target during reading; and a scan engine or imaging module supported by the housing. The imaging module includes a solid-state imager (or image sensor) with a sensor array of photocells or light sensors (also known as pixels), and an imaging lens assembly for capturing return light scattered and/or reflected from the target being imaged through the window over an imaging field of view, and for projecting the return light onto the image sensor to initiate capture of an image of the target over a range of working distances in which the target can be read. The image sensor may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are digitized, decoded and/or processed by a programmed microprocessor or controller into information related to the target being read, e.g., decoded data indicative of a symbol target, or into a picture of a non-symbol target.

In order to increase the amount of the return light captured by the sensor array, especially in dimly lit environments and/or at far range reading, an illuminating light assembly is typically provided inside the housing for illuminating the target, either continuously or intermittently, through the upright window with illumination light from an illumination light source, e.g., one or more light emitting diodes (LEDs), over an illumination field of view. An object sensing assembly may also be provided inside the housing, for activating or "waking up" the imaging module, e.g., the illuminating light assembly, only if an object or product bearing, or associated with, a target is detected within the imaging field of view. The object sensing assembly has one or more object light sources for emitting object sensing light, typically infrared (IR) light, and at least one object sensor for sensing the return IR light reflected and/or scattered from the object over an object detection field of view.

Although generally satisfactory for their intended purposes, the use of the illuminating light assembly and the object sensing assembly have sometimes proven to be disadvantageous, because a portion of the illumination light and/or of the IR light incident on the upright window of the workstation is reflected therefrom back into the imaging field of view of the image sensor. The reflected portion of the illumination light and/or of the IR light creates undesirable bright or "hot" spots in the imaging field of view, and these hot spots, also known as glare, are specular light, which can overload, saturate, and "blind" the image sensor, thereby degrading reading performance.

In the art of imaging readers, various means have been proposed to eliminate such hot spots caused by reflections of the illumination light and/or of the IR light off the upright window. For example, it is known to configure the upright window as a planar glass window lying in a vertical plane, or in a plane slightly tilted relative to the vertical, at the front of the housing, and to position the illumination LEDs closely adjacent to, and along an upper edge of, the upright window. Since the illumination LEDs in this latter arrangement are positioned well away from the image sensor, the illumination field of view may not be entirely commensurate in scope with the imaging field of view unless multiple LEDS are used to be sure that the illumination field of view will entirely cover the imaging field of view. However, this imposes not only an extra cost burden, but also an electrical power burden. It is desirable to keep electrical power consumption as low as possible, for example, to enable the reader to be powered over a USB cable interface. Furthermore, stray illumination light outside the imaging field of view has to be controlled by the use of light baffles and diffusers. Also, by positioning multiple illumination LEDs close to the upright window, their total illumination is often perceived as bothersome, distracting and annoying to the operators of the readers, and to nearby consumers being served.

As another example, it is also known in the art of imaging readers to configure the upright window with spherical surfaces to prevent the illumination light and/or the IR light incident on the window from reflecting back to the image sensor. This, however, constrains the industrial design of the workstation since, among other things, a spherical window is typically molded from plastic, and not glass.

It is desirable to have the imaging field of view relatively large at a near working distance or a close proximity to the window of the workstation so that the imaging field of view covers the entire target. At farther working distances, it is preferred to have the imaging field of view diverge slowly. An imaging field of view with such characteristics and with a good depth of field is advantageously achieved by making the internal optical path between the imaging module and the window relatively long, and this is typically obtained by inserting at least one fold mirror in this internal optical path to preserve a small, compact volume for the workstation. However, such a fold mirror exacerbates the hot spot problem, because the fold mirror constitutes another reflective surface. The fold mirror and the window form an internal light cavity in which the illumination light and/or the IR light can reflect or "bounce" back and forth, one or more times, back into the imaging field of view of the image sensor, thereby creating additional hot spots and noise, which further degrade reading and waking-up performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
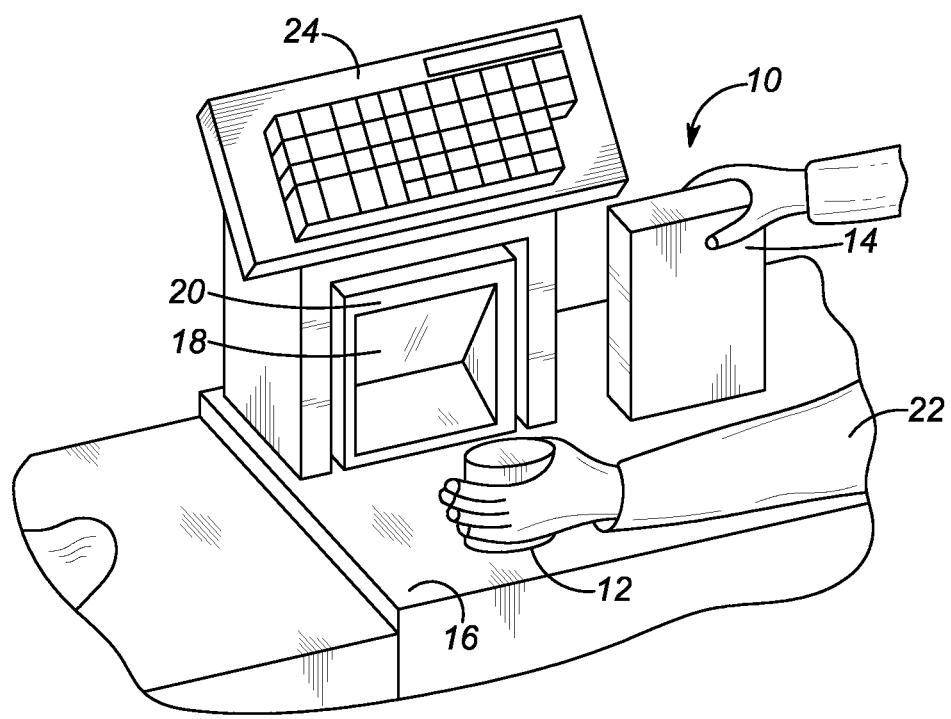
FIG. 1 is a perspective view of an electro-optical workstation configured as a vertical slot scanner in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a workstation for electro-optically reading targets by image capture. The workstation includes a housing for supporting a light-transmissive window, an imaging module mounted in the housing, and a fold mirror mounted in the housing between the window and the imaging module. The imaging module has an illuminating light assembly for directing illumination light, e.g., emitted from a pair of light emitting diodes (LEDs), along an illumination path in the housing through the window at a target for return therefrom during reading, and an image sensing assembly, e.g., a solid-state, image sensor and an imaging lens assembly, for detecting return illumination light returning from the target through the window along an imaging path in the housing over an imaging field of view during reading. The fold mirror is mounted in the illumination and the imaging paths, and is operative for folding the illumination and the imaging paths. The fold mirror lies in a plane and faces the window. The window also lies in a plane and is so oriented relative to the plane of the fold mirror to prevent reflections of the illumination light off of the fold mirror and the window from entering the imaging field of view as virtual images that degrade target detection by the image sensing assembly.

Preferably, the orientation of the window and the fold mirror is such that their respective planes are substantially parallel to each other. The term "substantially parallel" includes exactly parallel, as well as all relative orientations wherein the window and mirror planes are oriented in such a fashion as to eliminate all reflections back into the imaging field of view, for example, in a range of plus or minus 10 degrees out of exact parallelism. Thus, any reflections off of the fold mirror and/or off of the window are moved outside the imaging field of view and will not appear in the captured target image. Reading performance is thereby enhanced.

Another aspect of this disclosure relates to a method of electro-optically reading targets by image capture. This method is performed by supporting a light-transmissive window on a housing, directing illumination light along an illumination path in the housing through the window at a target for return therefrom during reading, detecting return illumination light returning from the target through the window along an imaging path in the housing over an imaging field of view during reading, folding the illumination and the imaging paths by mounting a fold mirror in the illumination and the imaging paths in the housing, configuring the fold mirror to lie in a plane, positioning the fold mirror to face the window, configuring the window to lie in a plane, and orienting the plane of the window relative to the plane of the fold mirror to prevent reflections of the illumination light off of the fold mirror and the window from entering the imaging field of view as virtual images that degrade target detection. As before, the orientation of the window and the fold mirror is preferably such that their respective planes are substantially parallel to each other.

Turning now to the drawings, reference numeral 10 in FIG. 1 generally identifies an electro-optical reading workstation for processing transactions at a checkout counter of a retail site at which objects or products, such as a can 12 or a box 14, each associated with, and preferably bearing, a target such as a bar code symbol, are processed for purchase. The counter includes a countertop 16 across which the products are presented or slid at a swipe speed past and across a generally planar, light-transmissive window 18 of a box-shaped housing of an imaging reader 20 configured as a vertical slot scanner mounted on the countertop 16. A user, preferably a checkout operator 22, is located at one side of the countertop 16, and the reader 20 is located at the opposite side. A cash/credit register 24 is located within easy reach of the operator 22. The reader 20 is portable and lightweight and may be picked up from the countertop 16 by the operator 22, and the window 18 may be aimed at a symbol, preferably on a product too heavy or too large to be easily positioned on the countertop 16 in front of the reader 20 in the workstation mode.

Figure 2:
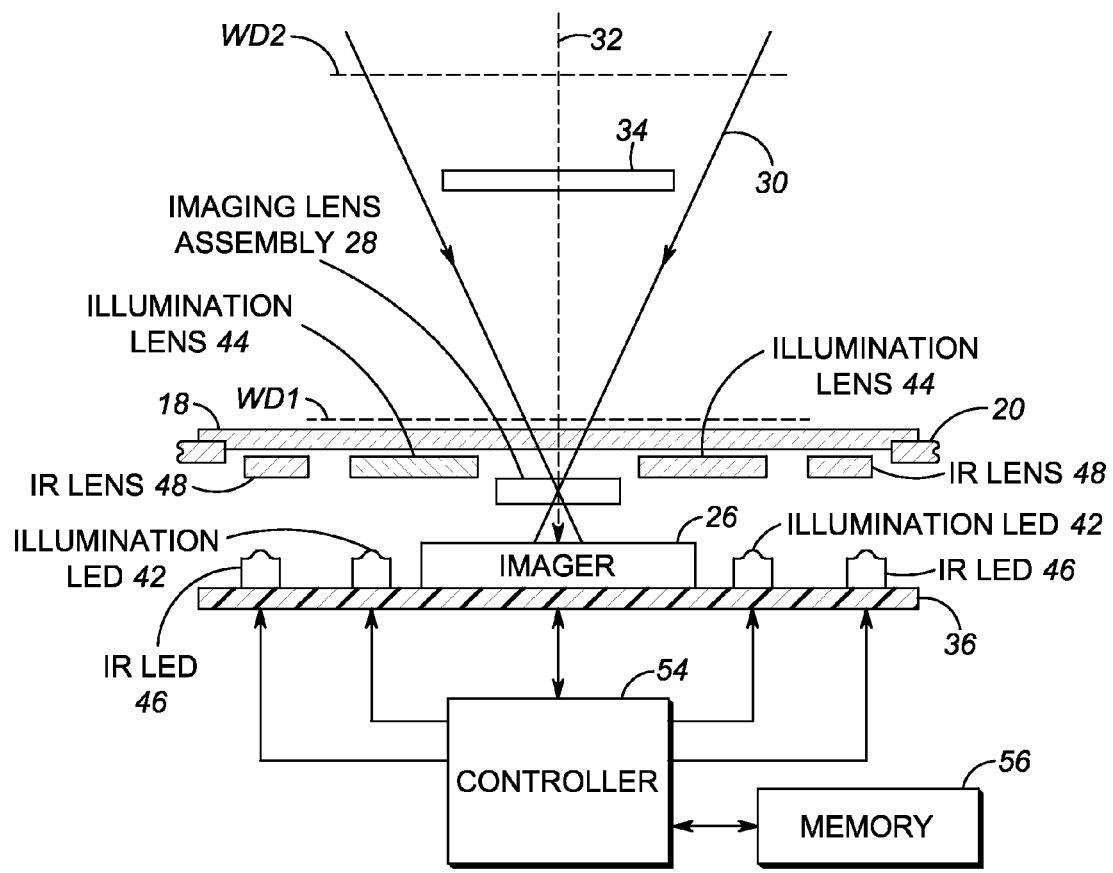
FIG. 2 is a part-schematic, part-diagrammatic view depicting various components of the workstation of FIG. 1.

The imaging reader 20 includes, as schematically shown in FIG. 2, an imaging module mounted in the housing. The imaging module comprises an image sensing assembly and an illuminating light assembly mounted on a support that includes a printed circuit board (PCB) 36. The image sensing assembly includes an image sensor or imager 26 mounted on the PCB 36, and an imaging lens assembly 28 mounted in front of the imager 26. The imager 26 is a solid-state device, for example, a CCD or a CMOS imager and has a linear or area array of addressable image sensors or pixels, preferably of submegapixel or supermegapixel size, having an imaging field of view 30 that diverges away from the window 18 in both horizontal and vertical directions. The imaging lens assembly 28 has an optical axis 32 and is operative for capturing light through the window 18 from a target, for example, a one- or two-dimensional symbol 34, located in a range of working distances along the optical axis 32 between a close-in working distance (WD1) and a far-out working distance (WD2), and for projecting the captured light onto the imager 26. In a preferred embodiment, WD1 is about two inches from the imager 26 and generally coincides with the window 18, and WD2 is about eight inches or more from the window 18.

The illuminating light assembly near the imaging module preferably includes a plurality of illumination light sources, e.g., a pair of light emitting diodes (LEDs) 42, mounted on the PCB 36 and arranged at opposite sides of the imager 26. A pair of illumination lenses 44 is mounted in front of the illumination LEDs 42 to uniformly illuminate the target symbol 34 with illumination light over an illumination field of view.

An object sensing system may also be mounted in the reader 20 as part of the imaging module. The object sensing system is operative for sensing an object 12, 14 associated with the target symbol 34, and for generating a trigger signal to initiate the reading. The object sensing system includes an object light source, preferably a pair of infrared (IR) light emitting diodes (LEDs) 46 mounted on the PCB 36 at opposite sides of the imager 26, and a pair of IR lenses 48 mounted in front of the IR LEDs 46, and together operative for directing object sensing IR light, which is invisible to the human eye, in a wavelength range from about 700 nm to about 1100 nm, over a viewing angle through the window 18 at the object 12, 14 for return therefrom. An object light sensor (not illustrated) is operative for detecting return object sensing IR light returned from the object 12, 14 through the window 18, thereby signaling that an object has entered the workstation.

The imager 26, the illumination LEDs 42 and the IR LEDs 46 are operatively connected to a controller or programmed microprocessor 54 operative for controlling the operation of these electrical components. A memory 56 is connected and accessible to the controller 54. Preferably, the controller 54 is the same as the one used for decoding light scattered from the target symbol 34 and for processing the captured target symbol images.

In operation, the controller 54 sends a command signal to energize the object sensing system to detect whether the object 12, 14 has entered the workstation from either the right or left sides thereof. If so, the trigger signal is generated to advise the controller 54 to send a command signal to energize the illuminating light assembly to pulse the illumination LEDs 42 for a short time period of, for example, 500 microseconds or less, and to energize the imager 26 to collect ambient light and illumination light reflected and/or scattered from the target symbol 34 substantially only during said time period. A typical imager needs about 16-33 milliseconds to read the entire target image and operates at a frame rate of about 30-60 frames per second.

The target symbol 34 may be a one- or a two-dimensional symbol whose use is becoming more widespread, especially in manufacturing environments and in package delivery. Sometimes, the target symbol 34 includes various lengths of truncated symbols of the type frequently found on frequent shopper cards, coupons, loyalty cards, in which case an area imager can read these additional symbols.

FIG. 1 depicts an imager-based vertical slot scanner 20. Other types of imager-based readers, such as a dual window, bi-optical workstation can be used. Other housings having different shapes, with one or more windows, are also within the spirit of this invention. For example, a stand-alone reader having a gun-shaped housing is another advantageous configuration.

Figure 3:
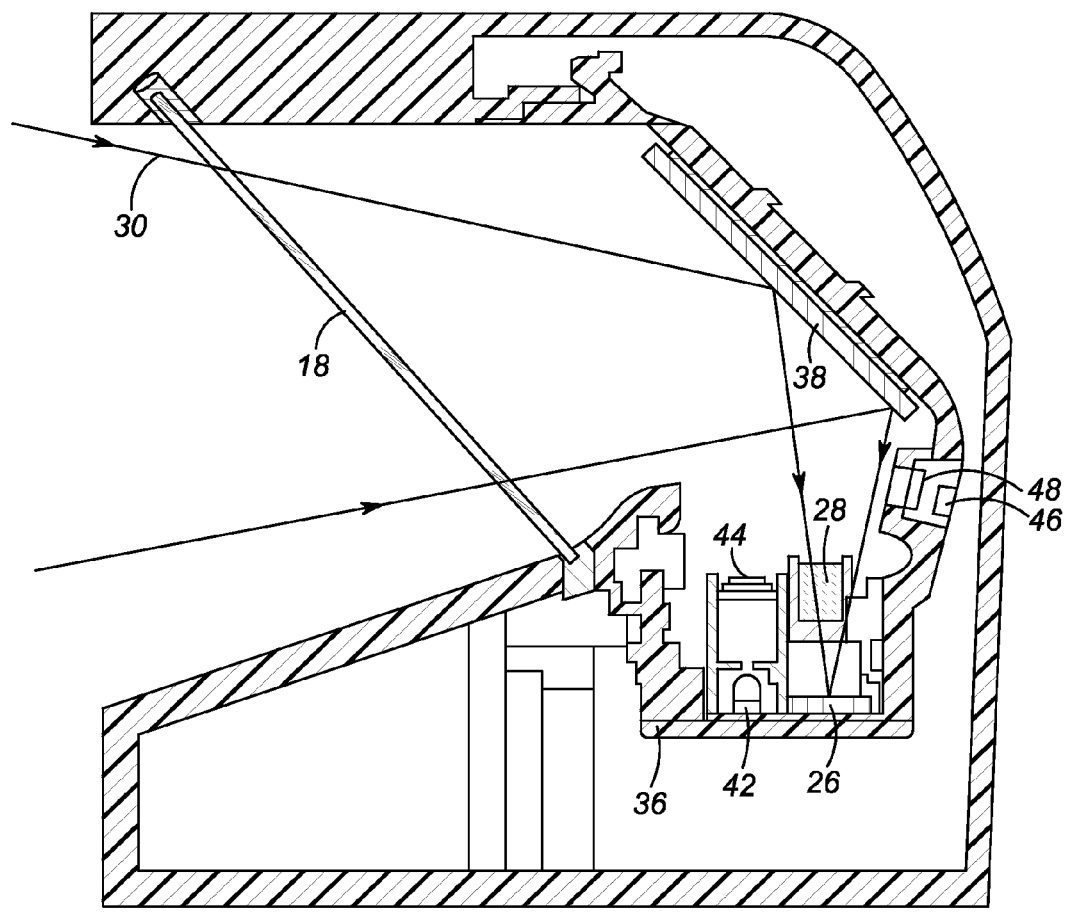
FIG. 3 is a sectional view of a practical implementation of the workstation of FIG. 1.

Turning now to a practical reader implementation as depicted in FIG. 3, the imaging module is mounted in the reader 20 such that the illuminating light assembly 42, 44 and the image sensing assembly 26, 28 face an overhead, stationary, generally planar, fold mirror 38 tilted at an angle of about 45 degrees. The fold mirror 38 lies in a plane facing the window 18 and is spaced from the window 18 to form an internal light cavity therewith. The illuminating light assembly 42, 44 directs illumination light upwardly toward the fold mirror 38 along an illumination path in the housing through the window 18 at the target 34 for return therefrom during reading. The image sensing assembly 26, 28 detects ambient light and the return illumination light returning from the target 34 through the window 18 and reflected off the fold mirror 38 downwardly along an imaging path in the housing over the imaging field of view 30 during reading.

The fold mirror 38 is mounted in the illumination and the imaging paths in the housing between the window 18 and the imaging module, and is operative for folding the illumination and the imaging paths. As noted above, it is desirable to have the imaging field of view 30 relatively large at a near working distance or a close proximity to the window 18 of the workstation so that the imaging field of view 30 covers the entire target 34. At farther working distances, it is preferred to have the imaging field of view 30 diverge slowly. An imaging field of view 30 with such characteristics and with a good depth of field is advantageously achieved by making the internal optical path between the imaging module and the window 18 relatively long, and this is achieved by the folding action of the fold mirror 38.

As described above, a portion of the illumination light and/or of the IR light incident on the window 18 is reflected therefrom into the imaging field of view 30 as one or more virtual images or hot spots (depicted as circular spots in FIG. 4) that degrade the performance of the imager 26. The hot spot problem is exacerbated by the fold mirror 38 which constitutes an additional surface from which a portion of the illumination light and/or of the IR light may be reflected therefrom back into the imaging field of view 30 through one or more reflections or bounces in the light cavity between the fold mirror 38 and the window 18 to create additional virtual images or hot spots (also depicted as circular spots in FIG. 4). These hot spots, also known as glare, are specular light, which can overload, saturate, and "blind" the imager 26, thereby compromising its capability.

Figure 4:
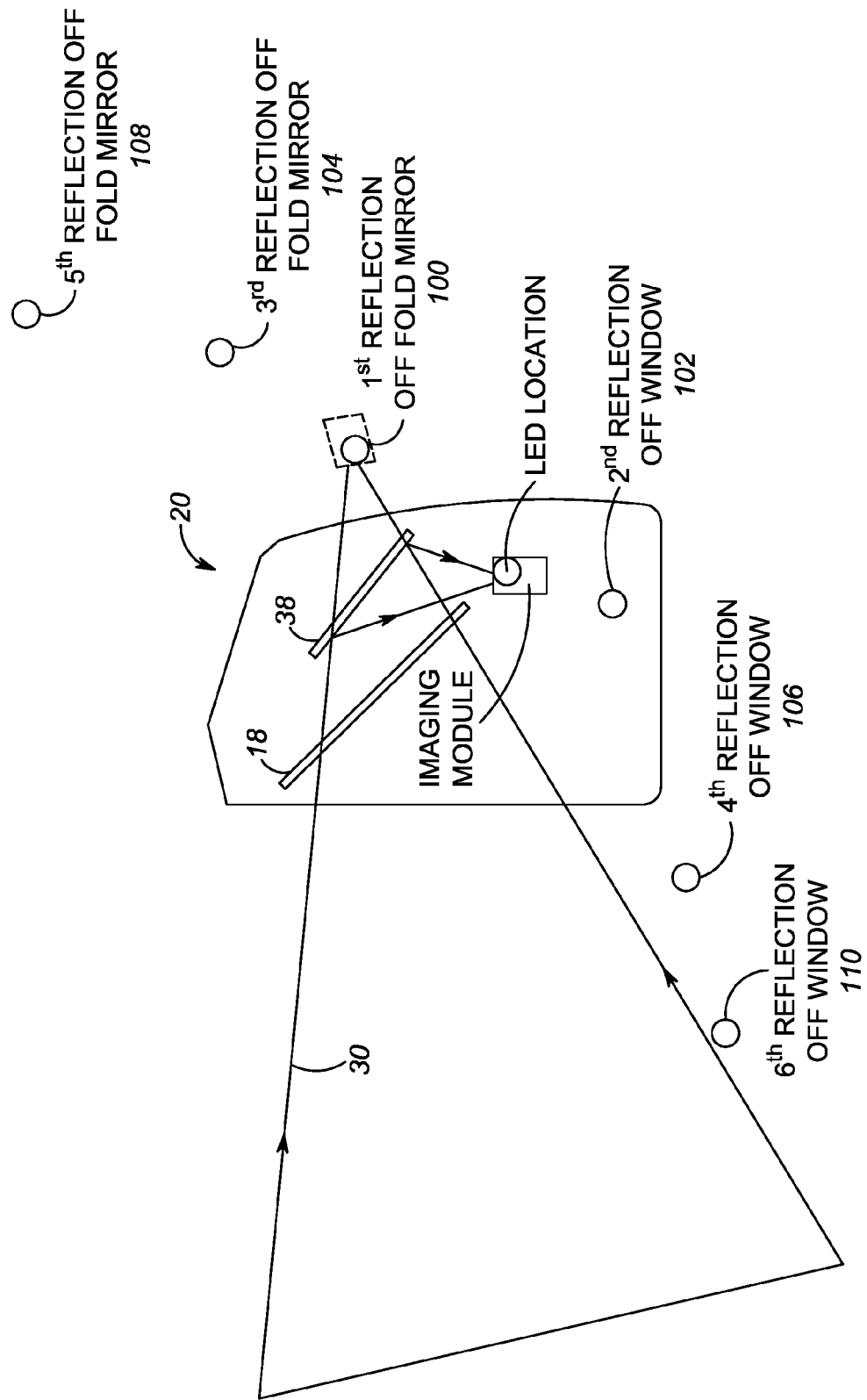
FIG. 4 is a schematic diagram of some of the components of FIG. 3 and depicts various virtual images or reflections whose deleterious effects are to be prevented in accordance with this invention.

The location of the LEDs 42 on the imaging module is schematically shown in FIG. 4, together with the fold mirror 38 and the window 18. A first reflection or virtual image 100 is the reflection of each LED 42 off the fold mirror 38. A second reflection or virtual image 102 is the reflection of the virtual image 100 off the window 18. A third reflection or virtual image 104 is the reflection of the virtual image 102 off the fold mirror 38. A fourth reflection or virtual image 106 is the reflection of the virtual image 104 off the window 18. A fifth reflection or virtual image 108 is the reflection of the virtual image 106 off the fold mirror 38. A sixth reflection or virtual image 110 is the reflection of the virtual image 108 off the window 18.

As shown in FIG. 4, all the virtual images 100, 102, 104, 106, 108 and 110 are located outside the imaging field of view 30 to prevent hot spots in the imaging field of view of the imager 26. This is advantageously achieved by configuring the window 18 to be substantially planar, and by orienting the plane of the window 18 to be substantially parallel relative to the plane of the fold mirror 38. The term "substantially parallel" includes exactly parallel, as well as all relative orientations wherein the mirror and window planes are oriented in such a fashion as to eliminate second, third, and n-th order reflections back into the imaging field of view 30, for example, in a range of plus or minus 10 degrees out of exact parallelism. Thus, any deleterious reflections off of the fold mirror 38 and/or off of the window 18 have been moved outside the imaging field of view 30 and will not appear in the captured target image. The imager 26 is no longer saturated. Reading performance is thereby enhanced.

In the foregoing specification, specific embodiments have been described. However, one of ordinary skill in the art appreciates that various modifications and changes can be made without departing from the scope of the invention as set forth in the claims below. For example, rather than generating a single aiming light spot centrally of the target, the aiming light assembly can generate two aiming light spots to bracket opposite ends of a one-dimensional target, or can generate four aiming light spots to bracket opposite corners of a two-dimensional target. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A workstation for electro-optically reading targets by image capture, comprising:
 a housing for supporting a light-transmissive window;
 an imaging module mounted in the housing, the imaging module including an illuminating light assembly for directing illumination light along an illumination path in the housing through the window at a target for return therefrom during reading, and an image sensing assembly for detecting return illumination light returning from the target through the window along an imaging path in the housing over an imaging field of view during reading;
 a fold mirror mounted in the illumination and the imaging paths in the housing between the window and the imaging module, and operative for folding the illumination and the imaging paths, the fold mirror lying in a plane and facing the window, and the window lying in a plane and oriented relative to the plane of the fold mirror to prevent reflections of the illumination light off of the fold mirror and the window from entering the imaging field of view as virtual images that degrade target detection by the image sensing assembly; and wherein the plane of the window is oriented in a range of plus or minus 10 degrees out of exact parallelism with the plane of the fold mirror.

2. The workstation of claim 1, wherein the housing is fixed relative to a support surface at the workstation, and wherein the window is elevated relative to the support surface.

3. The workstation of claim 1, wherein the illuminating light assembly includes a pair of light emitting diodes (LEDs) spaced apart from each other, and a pair of illumination lenses through which the illumination light passes en route to the fold mirror.

4. The workstation of claim 3, wherein the image sensing assembly includes a solid-state, image sensor having an array of pixels for detecting the return illumination light returning from the target, and an imaging lens assembly for capturing the return illumination light over the imaging field of view and over a range of working distances relative to the window.

5. The workstation of claim 4, wherein the imaging module includes a printed circuit board on which the illuminating light assembly and the image sensing assembly are commonly mounted, and wherein the LEDs are mounted at opposite sides of the image sensor on the board.

6. The workstation of claim 1, wherein the plane of the window is substantially parallel to the plane of the fold mirror.

7. The workstation of claim 1, wherein the fold mirror is mounted at an elevation above the imaging module.

8. The workstation of claim 1, wherein the image sensing assembly is operative for generating an electrical signal indicative of the detected return illumination light; and further comprising a controller for processing the electrical signal into data corresponding to the target.

9. A workstation for electro-optically reading targets by image capture, comprising:
a housing for supporting a light-transmissive window;
an imaging module mounted in the housing, the imaging module including an illuminating light assembly for directing illumination light along an illumination path in the housing through the window at a target for return therefrom during reading, and an image sensing assembly for detecting return illumination light returning from the target through the window along an imaging path in the housing over an imaging field of view during reading;
a fold mirror mounted in the illumination and the imaging paths in the housing between the window and the imaging module, and operative for folding the illumination and the imaging paths, the fold mirror lying in a plane and facing the window, and the window lying in a plane that is substantially parallel to the plane of the fold mirror to prevent reflections of the illumination light off of the fold mirror and the window from entering the imaging field of view as virtual images that degrade target detection by the image sensing assembly; and wherein the plane of the window is oriented in a range of plus or minus 10 degrees out of exact parallelism with the plane of the fold mirror.

10. A method of electro-optically reading targets by image capture, comprising:
supporting a light-transmissive window on a housing;
directing illumination light along an illumination path in the housing through the window at a target for return therefrom during reading;
detecting return illumination light returning from the target through the window along an imaging path in the housing over an imaging field of view during reading;
folding the illumination and the imaging paths by mounting a fold mirror in the illumination and the imaging paths in the housing;
configuring the fold mirror to lie in a plane;
positioning the fold mirror to face the window;
configuring the window to lie in a plane;
orienting the plane of the window relative to the plane of the fold mirror to prevent reflections of the illumination light off of the fold mirror and the window from entering the imaging field of view as virtual images that degrade target detection; and
wherein the orienting is performed by orienting the plane of the window to be in a range of plus or minus 10 degrees out of exact parallelism with the plane of the fold mirror.

11. The method of claim 10, and fixing the housing relative to a support surface at the workstation, and elevating the window relative to the support surface.

12. The method of claim 10, wherein the directing is performed by a pair of light emitting diodes (LEDs) spaced apart from each other, and a pair of illumination lenses through which the illumination light passes en route to the fold mirror.

13. The method of claim 12, wherein the detecting is performed by a solid-state, image sensor having an array of pixels for detecting the return illumination light returning from the target, and by an imaging lens assembly for capturing the return illumination light over the imaging field of view and over a range of working distances relative to the window.

14. The method of claim 13, and mounting the LEDs at opposite sides of the image sensor on a printed circuit board.

15. The method of claim 10, wherein the orienting is performed by orienting the plane of the window to be substantially parallel to the plane of the fold mirror.

16. The method of claim 10, and further comprising generating an electrical signal indicative of the detected return illumination light; and
processing the electrical signal into data corresponding to the target.

* * * * *